United States Patent
Kudo et al.

(10) Patent No.: US 11,277,594 B2
(45) Date of Patent: Mar. 15, 2022

(54) CONTROL METHOD FOR IMAGE PROJECTION SYSTEM AND IMAGE PROJECTION SYSTEM

(71) Applicant: SEIKO EPSON CORPORATION, Tokyo (JP)

(72) Inventors: Yusuke Kudo, Shiojiri (JP); Hirohiko Kihara, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/941,953

(22) Filed: Jul. 29, 2020

(65) Prior Publication Data
US 2021/0037221 A1 Feb. 4, 2021

(30) Foreign Application Priority Data
Jul. 30, 2019 (JP) .............................. JP2019-139368

(51) Int. Cl.
*H04N 9/31* (2006.01)

(52) U.S. Cl.
CPC ......... *H04N 9/3147* (2013.01); *H04N 9/3185* (2013.01); *H04N 9/3188* (2013.01); *H04N 9/3105* (2013.01); *H04N 9/3126* (2013.01)

(58) Field of Classification Search
CPC .. H04N 9/3147; H04N 9/3185; H04N 9/3188; H04N 9/3105; H04N 9/3126; H04N 9/31
See application file for complete search history.

(56) References Cited

U.S. PATENT DOCUMENTS

| | | | |
|---|---|---|---|
| 7,857,464 B2 | 12/2010 | Saito et al. | |
| 11,062,431 B2* | 7/2021 | Kudo | G06T 5/006 |
| 2005/0179825 A1* | 8/2005 | Hicks | H04N 9/28 |
| | | | 348/745 |
| 2018/0376031 A1* | 12/2018 | Oka | G06K 15/027 |
| 2019/0028685 A1* | 1/2019 | Kaji | G06T 7/74 |
| 2019/0035109 A1* | 1/2019 | Kaji | G06K 9/4671 |
| 2020/0169706 A1* | 5/2020 | Mori | H04N 9/3185 |
| 2020/0329220 A1* | 10/2020 | Kaji | G06T 7/33 |
| 2021/0037221 A1* | 2/2021 | Kudo | H04N 9/3147 |
| 2021/0192697 A1* | 6/2021 | Kudo | G06T 5/006 |

FOREIGN PATENT DOCUMENTS

| | | |
|---|---|---|
| JP | 2004-72623 A | 3/2004 |
| JP | 2006-245737 A | 9/2006 |
| JP | 2007-043274 A | 2/2007 |
| JP | 2011-29727 A | 2/2011 |

\* cited by examiner

*Primary Examiner* — Paulos M Natnael
(74) *Attorney, Agent, or Firm* — Oliff PLC

(57) ABSTRACT

A control method for an image projection system including a plurality of projectors includes a determining step of determining, based on a stack number indicating the number of the projectors, projected images of which are superimposed one another, colors of pattern images projected by the respective projectors equivalent to the stack number and a projecting step of causing the respective projectors equivalent to the stack number to project the pattern images having the colors determined in the determining step. In the determining step, when the pattern images equivalent to the stack number are superimposed, the colors of the pattern images projected by the respective projectors equivalent to the stack number are determined such that the superimposed pattern images equivalent to the stack number have a specific color.

9 Claims, 11 Drawing Sheets

FIG. 6

| PJ | STACK NUMBER NS | | | | |
|---|---|---|---|---|---|
| | 2 | 3 | 4 | 5 | 6 |
| 200A | No.1 | No.9 | No.2 | No.2 | No.2 |
| 200B | No.2 | No.10 | No.3 | No.3 | No.3 |
| 200C | | No.11 | No.6 | No.12 | No.12 |
| 200D | | | No.7 | No.9 | No.13 |
| 200E | | | | No.5 | No.8 |
| 200F | | | | | No.4 |

NC → No.2, No.3

TBL1

FIG. 7

TBL2

| COLOR NUMBER NC | R COMPONENT (LR) | G COMPONENT (LG) | B COMPONENT (LB) |
|---|---|---|---|
| No.1 | 0 | 255 | 255 |
| No.2 | 255 | 0 | 0 |
| No.3 | 0 | 255 | 0 |
| No.4 | 192 | 64 | 192 |
| No.5 | 192 | 192 | 64 |
| No.6 | 0 | 128 | 192 |
| No.7 | 128 | 0 | 192 |
| No.8 | 128 | 192 | 0 |
| No.9 | 0 | 128 | 255 |
| No.10 | 0 | 255 | 128 |
| No.11 | 255 | 0 | 128 |
| No.12 | 128 | 0 | 255 |
| No.13 | 0 | 192 | 255 |

FIG. 9

| IMAGE | SUPERIMPOSED STATE (SS) | R COMPONENT (LR) | G COMPONENT (LG) | B COMPONENT (LB) |
|---|---|---|---|---|
| 301 |  | 255 | 0 | 0 |
| 302 |  | 0 | 255 | 0 |
| 303 |  | 0 | 128 | 192 |
| 304 |  | 128 | 0 | 192 |
| 305 | 301 + 302 | 255 | 255 | 0 |
| 306 | 301 + 303 | 255 | 128 | 192 |
| 307 | 302 + 303 | 0 | 383 | 192 |
| 308 | 303 + 304 | 128 | 128 | 384 |
| 309 | 302 + 304 | 128 | 255 | 192 |
| 310 | 301 + 302 + 304 | 383 | 255 | 192 |
| 311 | 302 + 303 + 304 | 128 | 383 | 384 |
| 312 | 301 + 302 + 303 | 255 | 383 | 192 |
| 313 | 301 + 302 + 303 + 304 | 383 | 383 | 384 |

CONTROL METHOD FOR IMAGE PROJECTION SYSTEM AND IMAGE PROJECTION SYSTEM

The present application is based on, and claims priority from JP Application Serial Number 2019-139368, filed Jul. 30, 2019, the disclosure of which is hereby incorporated by reference herein in its entirety.

BACKGROUND

1. Technical Field

The present disclosure relates to a control method for an image projection system and the image projection system.

2. Related Art

There has been known a technique concerning a method of correcting positions of projected images projected by a plurality of projectors that superimposes projected images one another (see, for example, JP-A-2006-245737 (Patent Literature 1)).

A projected image correction device described in Patent Literature 1 includes first and second projecting means for projecting images onto the same projection surface, imaging means for photographing images on the projection surface, first instructing means for instructing the first and second projecting means to respectively project test images onto the projection surface at different timings, second instructing means for instructing the imaging means to photograph the test images when the test images are projected onto the projection surface, and correcting means for correcting, based on the test image from the first projecting means and the test image from the second projecting means photographed by the imaging means, images given to the first and second projecting means. The test images are white images.

However, when the positions of the projected images projected from the respective plurality of projectors greatly deviate from one another, it is likely that the projected image correction device described in Patent Literature 1 cannot correct the positions of the projected images.

When a user manually adjusts the positions of the projected images, it is difficult for the user to visually recognize to which degree the projected images overlap one another when the white test images are projected at the different timings as in the projected image correction device described in Patent Literature 1. Further, even when the respective plurality of projectors project the test images at the same timing, it is also difficult for the user to visually recognize how the projected image from which projector deviates.

SUMMARY

An aspect is directed to a control method for an image projection system including a plurality of projectors, the control method for the image projection system including: a determining step of determining, based on a superimposition number indicating a number of the projectors, projected images of which are superimposed one another, colors of pattern images projected by the respective projectors equivalent to the superimposition number; and a projecting step of causing the respective projectors equivalent to the superimposition number to project the pattern images having the colors determined in the determining step. In the determining step, when the pattern images equivalent to the superimposition number are superimposed, the colors of the pattern images projected by the respective projectors equivalent to the superimposition number are determined such that the superimposed pattern images equivalent to the superimposition number have a specific color.

In the control method for an image projection system, the specific color may be white.

In the control method for an image projection system, the colors of the pattern images projected in the determining step by the respective projectors equivalent to the superimposition number may be determined to be colors different from the specific color.

In the control method for an image projection system, when the superimposition number is three or more, in the determining step, the colors of the pattern images projected by the respective projectors equivalent to the superimposition number may be determined such that, when a number of the projectors corresponding to a superimposed image indicating an image obtained by superimposing the pattern images is smaller than the superimposition number, a color of the superimposed image is a color different from the specific color.

In the control method for an image projection system, in the determining step, when at least one of the projectors corresponding to a respective pair of the superimposed images is different, the colors of the pattern images projected by the respective projectors equivalent to the superimposition number may be determined such that colors of the two superimposed images are colors different from each other.

In the control method for an image projection system, in the determining step, the colors of the pattern images projected by the respective projectors equivalent to the superimposition number may be determined such that the color of the superimposed image is a color different from the colors of the pattern images projected by the respective projectors equivalent to the superimposition number.

In the control method for an image projection system, in the determining step, the colors of the pattern images projected by the respective projectors equivalent to the superimposition number may be determined such that relative luminous efficiency is equal to or larger than a threshold.

In the control method for an image projection system, the pattern images may include rectangular images at respective four corners, and a size of the rectangular images may be determined according to an ability for correcting a size of a projection region of the projector.

Another aspect is directed to an image projection system including a plurality of projectors, the image projection system including: a determining section configured to determine, based on a superimposition number indicating a number of the projectors, projected images of which are superimposed one another, colors of pattern images projected by the respective projectors equivalent to the superimposition number; and a projection control section configured to cause the respective projectors equivalent to the superimposition number to project the pattern images having the colors determined by the determining section. When the pattern images equivalent to the superimposition number are superimposed, the determining section determines the colors of the pattern images projected by the respective projectors equivalent to the superimposition number such that the superimposed pattern images equivalent to the superimposition number have a specific color.

BRIEF DESCRIPTION OF THE DRAWINGS

FIG. 6 is a diagram showing an example of a first color number table.

FIG. 7 is a diagram showing an example of a second color number table.

FIG. 9 is a diagram showing an example of R, G, and B components of the images shown in FIG. 8.

DESCRIPTION OF EXEMPLARY EMBODIMENTS

An embodiment is explained below with reference to the drawings.

Figure 1:
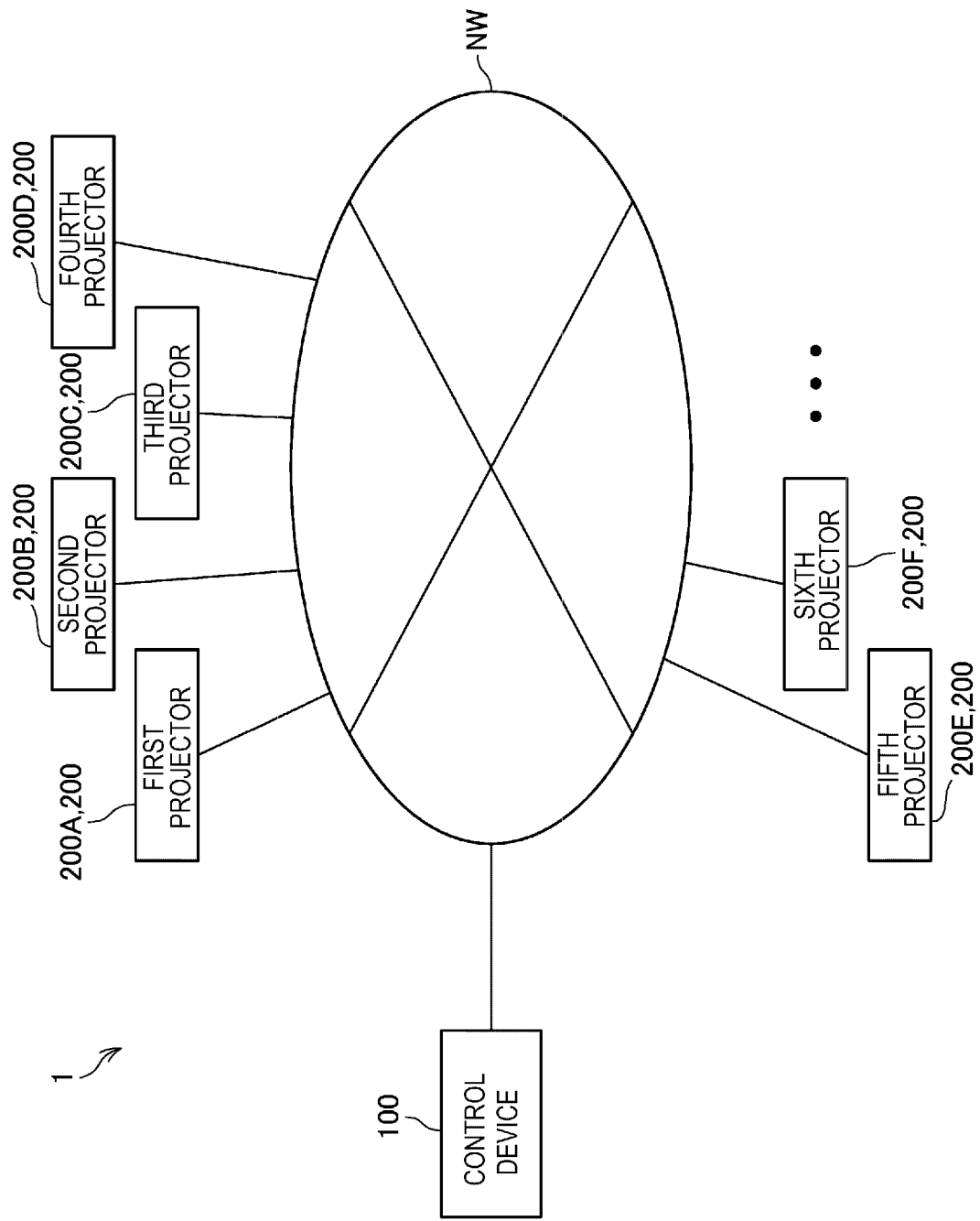
FIG. 1 is a diagram showing an example of the configuration of an image projection system.

1. Configuration of an Image Projection System 1-1. Overall Configuration of the Image Projection System FIG. 1 is a diagram showing an example of the configuration of an image projection system 1.

The image projection system 1 in this embodiment includes a control device 100 and a plurality of projectors 200. The control device 100 and the respective plurality of projectors 200 are communicably coupled via a network NW. The network NW is, for example, a LAN (Local Area Network). Communication is executed according to the Ethernet (registered trademark) standard.

The image projection system 1 includes, as the plurality of projectors 200, a first projector 200A, a second projector 200B, a third projector 200C, a fourth projector 200D, a fifth projector 200E, and a sixth projector 200F.

The respective first to sixth projectors 200A to 200F have substantially the same configurations.

In the following explanation, when it is not particularly necessary to distinguish the respective first to sixth projectors 200A to 200F, the first to sixth projectors 200A to 200F are sometimes described as projectors 200.

For example, the control device 100 sets the positions of images projected by respective at least two projectors 200 among the first to sixth projectors 200A to 200F such that the images projected by the respective at least two projectors are superimposed each other. In other words, stack projection of the images projected by the respective at least two projectors among the first to sixth projectors 200A to 200F is performed.

The control device 100 controls colors of pattern images 400 projected by the respective first to sixth projectors 200A to 200F. The pattern images 400 are explained in detail below with reference to FIG. 11.

The respective first to sixth projectors 200A to 200F receive operation by a user and adjust the positions of the pattern images 400 projected by the projectors 200. Specifically, the user performs adjustment of the positions of main bodies of the projectors 200, adjustment of a lens shift, adjustment of zoom, and the like to thereby adjust the positions of the pattern images 400 projected by the projectors 200.

The configuration of the control device 100 is explained below with reference to FIGS. 2 and 4.

In this embodiment, the control device 100 controls the colors of the pattern images 400 projected by the respective first to sixth projectors 200A to 200F. However, the present disclosure is not limited to this. For example, a second control section 250 of the first projector 200A explained below with reference to FIG. 3 may control the colors of the pattern images 400 projected by the respective first to sixth projectors 200A to 200F.

In this embodiment, the first projector 200A is coupled to the respective second to sixth projectors 200B to 200F via the network NW. However, the first projector 200A may be daisy chain-coupled to the respective second to sixth projectors 200B to 200F. For example, the first projector 200A is USB (Universal Serial Bus)-coupled to the second projector 200B. The second projector 200B is USB-coupled to the third projector 200C. The third projector 200C is USB-coupled to the fourth projector 200D. The fourth projector 200D is USB-coupled to the fifth projector 200E. The fifth projector 200E is USB-coupled to the sixth projector 200F.

The first projector 200A may be configured to be wirelessly communicable with the respective second to sixth projectors 200B to 200F according to the Wi-Fi (registered trademark) standard or the like.

1-2. Configuration of the Control Device

Figure 2:
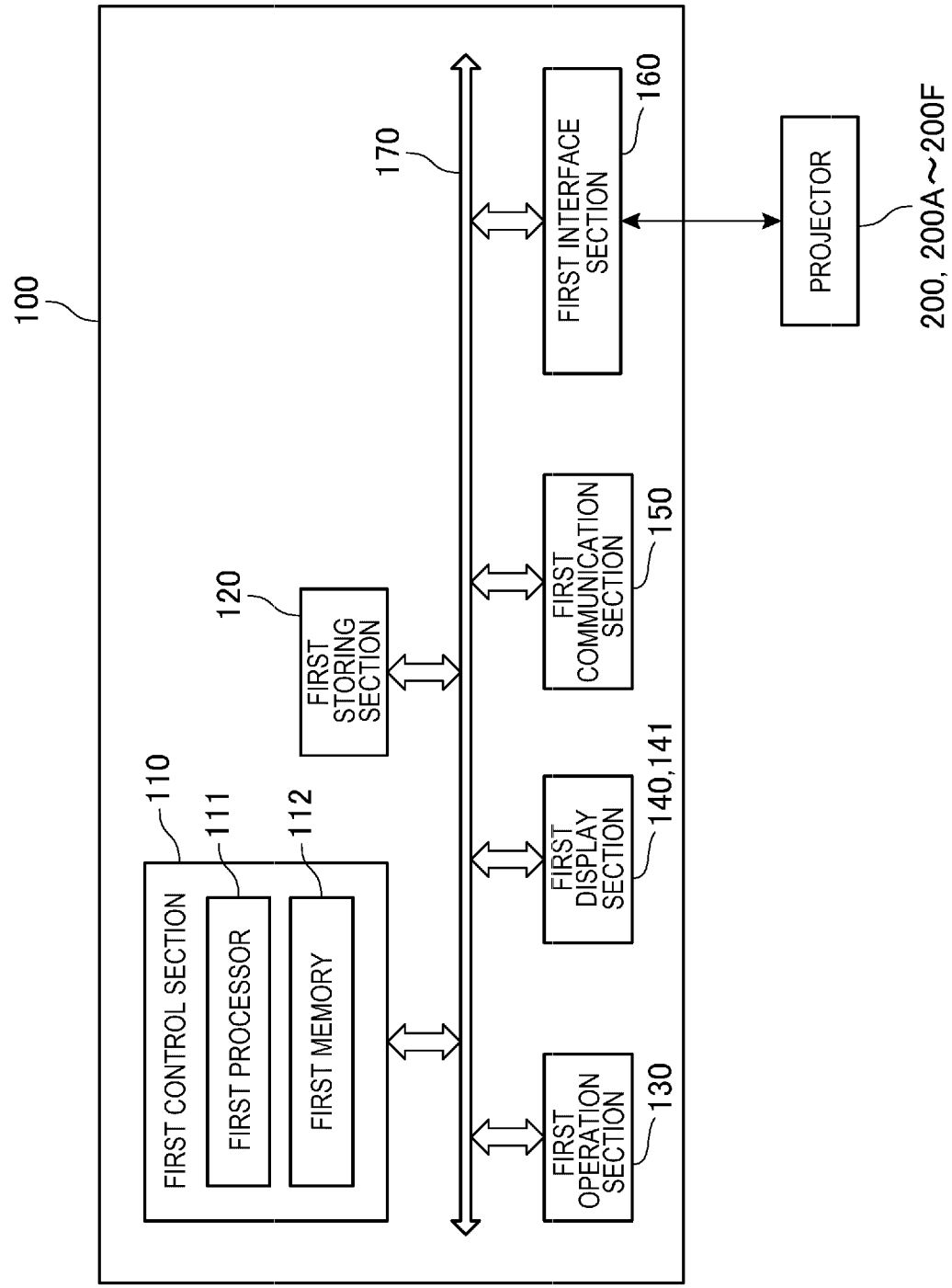
FIG. 2 is a diagram showing an example of the configuration of a control device.

FIG. 2 is a diagram showing an example of the configuration of the control device 100.

The control device 100 is communicably coupled to the projectors 200 and transmits various kinds of setting information and various kinds of instruction information to the projectors 200. In this embodiment, the control device 100 is communicably coupled to the projectors 200 via the network NW.

The control device 100 is configured by, for example, a personal computer and includes a first control section 110, a first storing section 120, a first operation section 130, a first display section 140, a first communication section 150, and a first interface section 160.

The first storing section 120, the first operation section 130, the first display section 140, the first communication section 150, and the first interface section 160 are coupled to the first control section 110 by a first internal bus 170.

The first control section 110 includes a first processor 111 and a first memory 112 and controls the sections of the control device 100.

The first memory 112 is a storage device that stores, in a nonvolatile manner, programs to be executed by the first processor 111 and data to be processed by the first processor 111. The first memory 112 is configured by a magnetic storage device, a semiconductor storage element such as a flash ROM (Read Only Memory), or a nonvolatile storage device of another type. The first memory 112 may include a RAM (Random Access Memory) configuring a work area of the first processor 111. The first memory 112 stores data to be processed by the first control section 110 and a first control program to be executed by the first processor 111.

The first processor 111 may be configured by a single processor. A plurality of processors may be configured to function as the first processor 111. The first processor 111 executes the first control program and controls the sections of the control device 100.

The first storing section 120 stores, in a nonvolatile manner, programs to be executed by the first control section 110 and data to be processed by the first control section 110. The first storing section 120 is, for example, a magnetic recording device such as a HDD (Hard Disk Drive) or a storage device including a semiconductor storage element such as a flash memory.

The first storing section 120 stores an operating system (OS) functioning as a basic control program to be executed by the first control section 110, application programs operating using the OS as a platform, and the like. The first storing section 120 stores data to be processed during execution of the application programs, data of processing results, and the like.

The operation section 130 receives operation from the user, generates an operation signal, and outputs the operation signal to the first control section 110. The first operation section 130 includes, for example, a keyboard and a mouse.

The first display section 140 includes a display panel 141 that displays various images according to the control by the first control section 110. The display panel 141 includes, for example, an LCD (Liquid Crystal Display). The display panel 141 is configured in a rectangular shape. In this embodiment, the display panel 141 has an oblong shape.

In this embodiment, the display panel 141 is configured as a touch panel. That is, a touch sensor that detects a position touched by a pen, a finger of the user, or the like on the display panel 141 is disposed on the display panel 141.

In the following explanation in this embodiment, the display panel 141 receives operation from the user.

The first communication section 150 is a communication interface that executes data communication with external devices including the projectors 200. The first communication section 150 includes an interface circuit that processes signals to be transmitted and received. The first communication section 150 is, for example, a wireless communication interface adapted to the Wi-Fi (registered trademark) standard.

The first interface section 160 is an interface coupled to an external device. The first interface section 160 executes, for example, communication conforming to the Ethernet (registered trademark) standard. The first interface section 160 includes a connector that couples an Ethernet (registered trademark) cable and an interface circuit that processes a signal transmitted through the connector. The first interface section 160 is an interface substrate including the connector and the interface circuit. The first interface section 160 is coupled to a main substrate on which, for example, the processor of the first control section 110 is mounted. Alternatively, the connector and the interface circuit configuring the first interface section 160 are mounted on the main substrate of the control device 100.

In this embodiment, the first control section 110 transmits various kinds of setting information and various kinds of instruction information to the projectors 200 via the first interface section 160. However, the first control section 110 may transmit the various kinds of setting information and the various kinds of instruction information to the projectors 200 via the first communication section 150. In other words, in this embodiment, the first control section 110 transmits the various kinds of setting information and the various kinds of instruction information to the projectors 200 through wired communication. However, the first control section 110 may transmit the various kinds of setting information and the various kinds of instruction information to the projectors 200 through wireless communication.

In this embodiment, the control device 100 is configured by the personal computer. However, the control device 100 may be configured by a tablet terminal, a smartphone, or the like.

1-3. Configuration of the Projector

Figure 3:
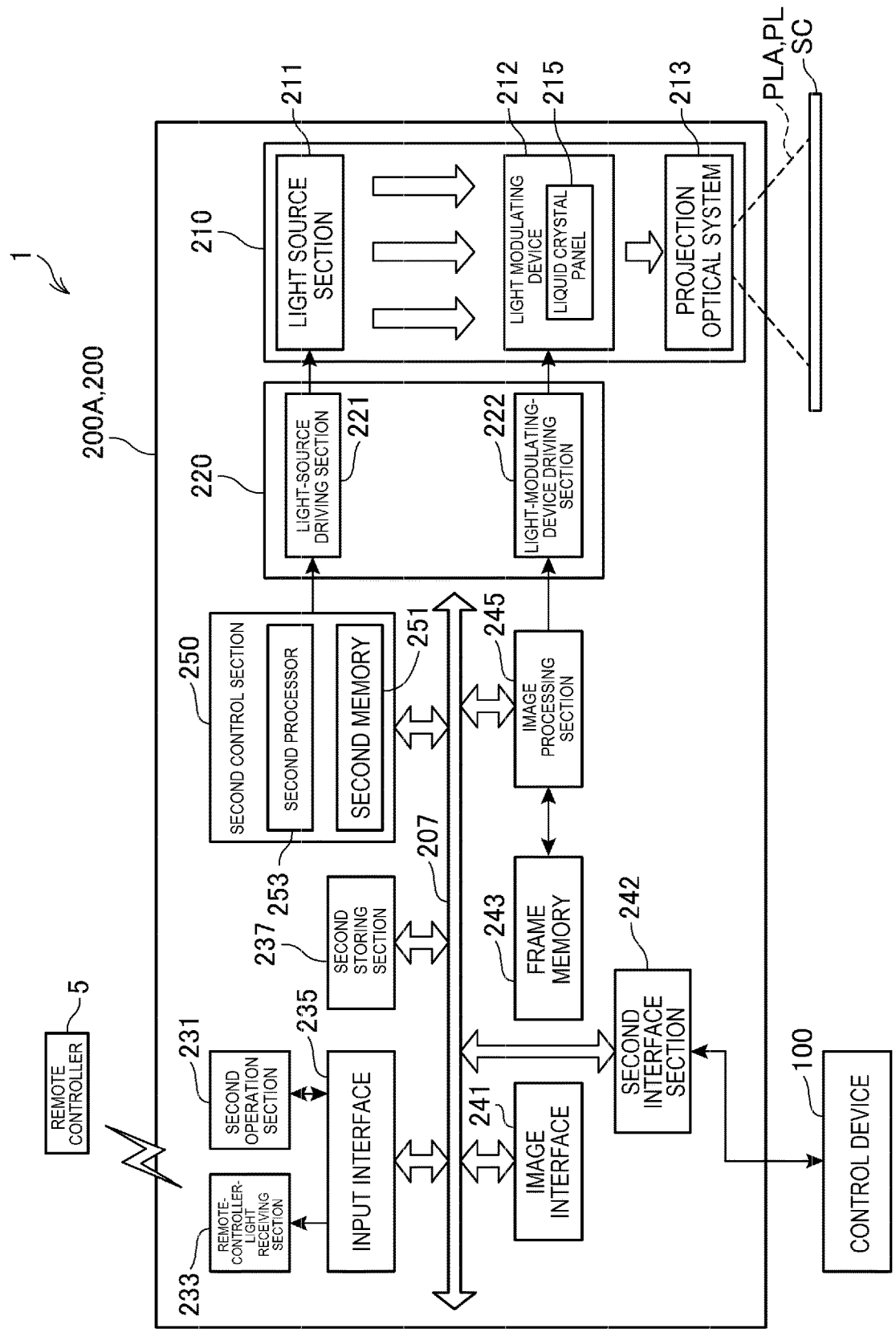
FIG. 3 is a diagram showing an example of the configuration of a first projector.

FIG. 3 is a diagram showing an example of the configuration of the first projector 200A.

Since the respective first to sixth projectors 200A to 200F have substantially the same configuration, the configuration of the first projector 200A is explained with reference to FIG. 3. Explanation about the respective second to sixth projectors 200B to 200F is omitted.

The first projector 200A includes a projecting section 210 and a driving section 220 that drives the projecting section 210. The projecting section 210 forms an optical image and projects the image onto a screen SC.

The projecting section 210 includes a light source section 211, a light modulating device 212, and a projection optical system 213. The driving section 220 includes a light-source driving section 221 and a light-modulating-device driving section 222.

The light source section 211 includes a lamp such as a halogen lamp, a Xenon lamp, or an ultrahigh pressure mercury lamp or a solid-state light source such as an LED (Light Emitting Diode) or a laser light source.

The light source section 211 may include a reflector that guides light emitted by a light source to the light modulating device 212 and an auxiliary reflector. Further, the light source section 211 may include a lens group and a polarizing plate for improving an optical characteristic of projected light or a dimming element that reduces a light amount of the light emitted by the light source on a path leading to the light modulating device 212.

The light-source driving section 221 is coupled to a second internal bus 207 and lights and extinguishes the light source of the light source section 211 according to an instruction of the second control section 250 coupled to the second internal bus 207.

The light modulating device 212 includes, for example, a three liquid crystal panels 215 corresponding to the three primary colors of R, G, and B. R indicates red, G indicates green, and B indicates blue. That is, the light modulating device 212 includes the liquid crystal panel 215 corresponding to R color light, the liquid crystal panel 215 corresponding to G color light, and the liquid crystal panel 215 corresponding to B color light.

Light emitted by the light source section 211 is separated into color lights of the three colors of R, G, and B. The color lights are respectively made incident on the liquid crystal panels 215 corresponding thereto. The respective three liquid crystal panels 215 are transmissive liquid crystal panels and modulate lights transmitted therethrough to generate image lights PL. The image lights PL passed through the liquid crystal panels 215 and modulated are combined by a combination optical system such as a cross dichroic prism and emitted to the projection optical system 213.

In the following explanation, in some case, the image light PL of the first projector 200A is described as image light PLA, the image light PL of the second projector 200B is described as image light PLB, the image light PL of the third projector 200C is described as image light PLC, and the image light PL of the fourth projector 200D is described as image light PLD.

In the following explanation in this embodiment, the light modulating device 212 includes the transmissive liquid crystal panels 215 as light modulating elements. However, this embodiment is not limited to this. The light modulating elements may be reflective liquid crystal panels or may be digital micromirror devices.

The light modulating device 212 is driven by the light-modulating-device driving section 222. The light-modulating-device driving section 222 is coupled to an image processing section 245.

Image data corresponding to the primary colors of R, G, and B are input to the light-modulating-device driving section 222 from the image processing section 245. The light-modulating-device driving section 222 converts the input image data into data signals suitable for the operation of the liquid crystal panels 215. The light-modulating-device driving section 222 applies voltages to pixels of the liquid crystal panels 215 based on the converted data signals and draws images on the liquid crystal panels 215.

The projection optical system 213 includes a lens, a mirror, and the like that focus the incident image lights PL on the screen SC. The projection optical system 213 may include a zoom mechanism for enlarging or reducing an image projected onto the screen SC and a focus adjusting mechanism for performing adjustment of a focus.

The projector 200 further includes a second operation section 231, a remote-controller-light receiving section 233, an input interface 235, a second storing section 237, an image interface 241, a second interface section 242, a frame memory 243, the image processing section 245, and the second control section 250. The input interface 235, the second storing section 237, the image interface 241, the second interface section 242, the image processing section 245, and the second control section 250 are coupled to one another via the second internal bus 207 to be capable of performing data communication.

The second operation section 231 includes various buttons and switches provided on a housing surface of the projector 200. The second operation section 231 generates operation signals corresponding to operation of the buttons and the switches and outputs the operation signals to the input interface 235. The input interface 235 includes a circuit that outputs the operation signals input from the second operation section 231 to the second control section 250.

The remote-controller-light receiving section 233 receives an infrared signal transmitted from a remote controller 5 and decodes the received infrared signal to generate an operation signal. The remote-controller-light receiving section 233 outputs the generated operation signal to the input interface 235. The input interface 235 outputs the operation signal input from the remote-controller-light receiving section 233 to the second control section 250.

The second storing section 237 is, for example, a nonvolatile storage device such as a hard disk drive or an SSD (Solid State Drive). The second storing section 237 stores programs to be executed by the second control section 250 and data, image data, and the like processed by the second control section 250.

The image interface 241 includes a connector and an interface circuit. The image interface 241 is configured to be couplable to, by wire, a not-shown image supply device that supplies image data to the projector 200.

The second interface section 242 is a communication interface that executes communication with the control device 100 according to the Ethernet (registered trademark) standard. The second interface section 242 includes a connector that couples an Ethernet (registered trademark) cable and an interface circuit that processes a signal transmitted through the connector. The second interface section 242 is an interface substrate including a connector and an interface circuit. The second interface section 242 is coupled to a main substrate on which, for example, a second processor 253 of the second control section 250 is mounted. Alternatively, the connector and the interface circuit configuring the second interface section 242 are mounted on the main substrate of the second control section 250. The second interface section 242 receives, for example, various kinds of setting information and various kinds of instruction information from the control device 100.

The second control section 250 includes a second memory 251 and a second processor 253.

The second memory 251 is a storage device that stores, in a nonvolatile manner, programs to be executed by the second processor 253 and data to be processed by the second processor 253. The second memory 251 is configured by a magnetic storage device, a semiconductor storage element such as a flash ROM, or a nonvolatile storage device of another type. The second memory 251 may include a RAM configuring a work area of the second processor 253. The second memory 251 stores data to be processed by the second control section 250 and a second control program to be executed by the second processor 253.

The second processor 253 may be configured by a single processor. A plurality of processors may function as the second processor 253. The second processor 253 executes the second control program and controls the sections of the projector 200. For example, the second processor 253 outputs, to the image processing section 245, an execution instruction for image processing corresponding to operation received by the second operation section 231 or the remote controller 5 and parameters used for the image processing. The parameters include, for example, a geometric correction parameter for correcting geometric distortion of an image projected onto the screen SC. The second processor 253 controls the light-source driving section 221 to control lighting and extinction of the light source section 211 and adjusts the luminance of the light source section 211.

The image processing section 245 and the frame memory 243 can be configured by, for example, an integrated circuit. The integrated circuit includes an LSI, an ASIC (Application Specific Integrated Circuit), and a PLD (Programmable Logic Device). The PLD includes, for example, an FPGA (Field-Programmable Gate Array). An analog circuit may be included in a part of the configuration of the integrated circuit. The image processing section 245 and the frame memory 243 may be a combination of a processor and an integrated circuit. The combination of the processor and the integrated circuit is called microcontroller (MCU), SoC (System-on-a-chip), system LSI, chip set, and the like.

The image processing section 245 develops, on the frame memory 243, image data input from the image interface 241. The frame memory 243 includes a plurality of banks. The banks have a storage capacity for enabling writing of image data for one frame. The frame memory 243 is configured by, for example, an SDRAM (Synchronous Dynamic Random Access Memory).

The image processing section 245 performs, on the image data developed on the frame memory 243, for example, image processing such as resolution conversion processing or resize processing, correction of distortion aberration, shape correction processing, digital zoom processing, and adjustment of a tint and luminance of an image.

The image processing section 245 generates a vertical synchronization signal obtained by converting an input frame frequency of a vertical synchronization signal into a drawing frequency. The generated vertical synchronization signal is referred to as output synchronization signal. The image processing section 245 outputs the generated output synchronization signal to the light-modulating-device driving section 222.

1-4. Configuration of the First Control Section

Figure 4:
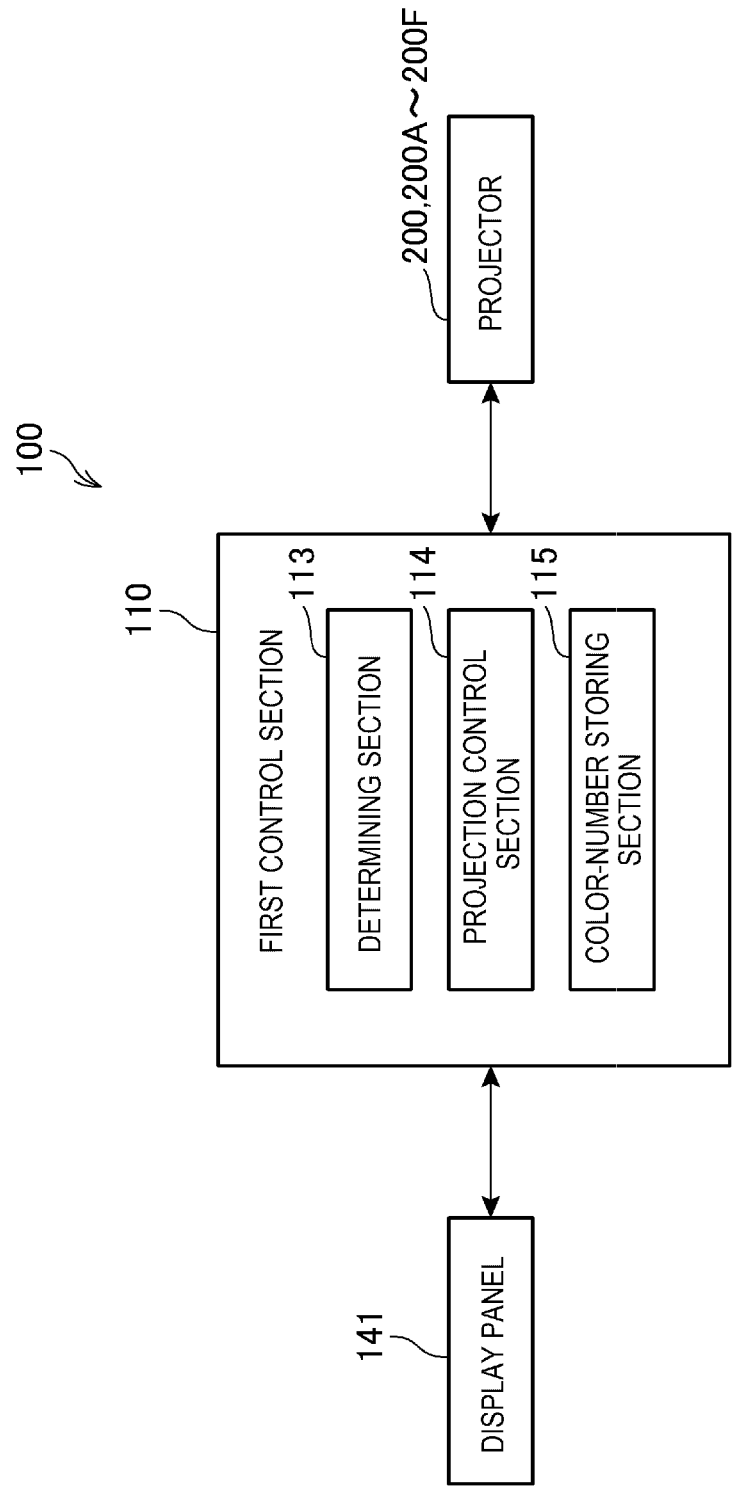
FIG. 4 is a diagram showing an example of the configuration of a first control section of the control device.

FIG. 4 is a diagram showing an example of the configuration of the first control section 110 of the control device 100.

The first control section 110 of the control device 100 includes a determining section 113, a projection control section 114, and a color-number storing section 115. Specifically, the first processor 111 of the first control section 110 executes the first control program stored in the first memory 112 to thereby function as the determining section 113 and the projection control section 114. The first processor 111 of the first control section 110 executes the first control program stored in the first memory 112 to thereby cause the first memory 112 to function as the color-number storing section 115.

The color-number storing section 115 stores a first color number table TBL1 and a second color number table TBL2.

The first color number table TBL1 specifies, according to a stack number NS, color numbers NC of projected images PM projected by the projectors 200. The stack number NS indicates the number of the projectors 200, the projected images PM of which are superimposed one another. The stack number NS corresponds to an example of a "superimposition number". The color numbers NC specify colors of the pattern images 400 projected by the projectors 200. The pattern images 400 correspond to an example of the projected images PM.

The first color number table TBL1 is explained in detail below with reference to FIG. 6.

The second color number table TBL2 specifies a relation between the color numbers NC and R components LR, G components LG, and B components LB of the projected images PM indicated by the color numbers NC.

The second color number table TBL2 is explained in detail below with reference to FIG. 7.

In the following explanation in this embodiment, the projected images PM are the pattern images 400.

The determining section 113 determines, based on the stack number NS, colors of the pattern images 400 projected by the respective projectors 200 equivalent to the stack number NS.

The determining section 113 determines colors of the pattern images 400 projected by the respective projectors 200 equivalent to the stack number NS such that, when the pattern images 400 equivalent to the stack number NS are superimposed, the superimposed pattern images 400 equivalent to the stack number NS have a specific color.

Specifically, the determining section 113 determines, based on the stack number NS, referring to the first color number table TBL1, the color numbers NC of the pattern images 400 projected by the respective projectors 200 equivalent to the stack number NS. The determining section 113 determines, referring to the second color number table TBL2, the R components LR, the G components LG, and the B components LB of the pattern images 400 projected by the respective projectors 200 equivalent to the stack number NS.

In this embodiment, the "specific color" is, for example, white.

The projection control section 114 causes the respective projectors 200 equivalent to the stack number NS to project the pattern images 400 having the colors determined by the determining section 113.

Figure 5:
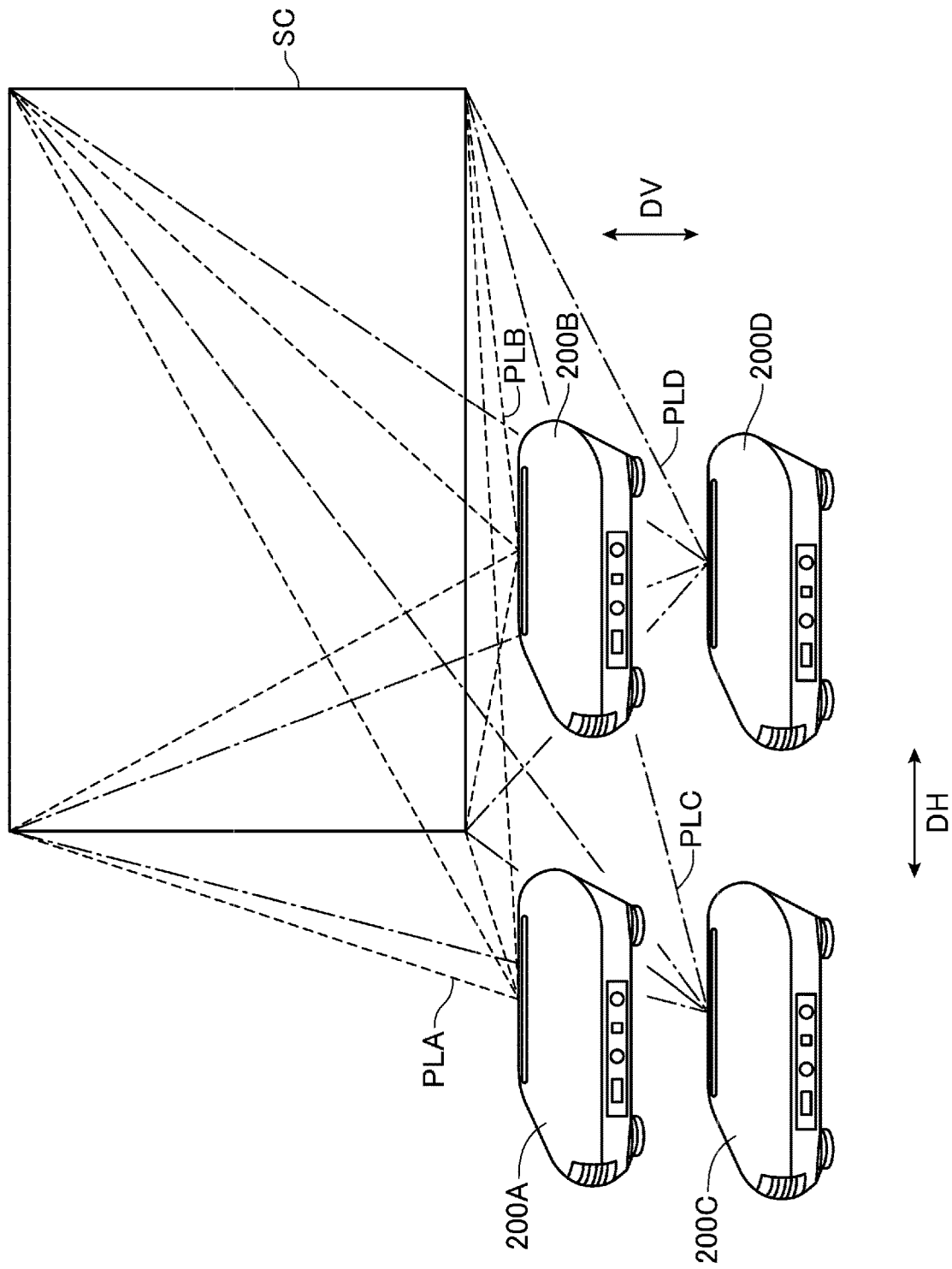
FIG. 5 is a perspective view showing an example of a projection state at the time when a stack number is four.

2. Specific Form 2-1. Projection State at the Time when the Stack Number of Four FIG. 5 is a perspective view showing an example of a projection state at the time when the stack number NS is four.

When the stack number NS is four, for example, the respective first to fourth projectors 200A to 200D project the respective image lights PLA to PLD such that the image lights PLA to PLD are superimposed one another on the screen SC.

The first projector 200A and the second projector 200B are disposed in a left-right direction DH with respect to each other. The third projector 200C and the fourth projector 200D are disposed in the left-right direction DH with respect to each other. The left-right direction DH indicates a direction parallel to the horizontal direction.

The first projector 200A and the third projector 200C are disposed in an up-down direction DV with respect to each other. The second projector 200B and the fourth projector 200D are disposed in the up-down direction DV with respect to each other. The up-down direction DV indicates a direction perpendicular to the horizontal direction.

2-2. First Color Number Table

FIG. 6 is a diagram showing an example of the first color number table TBL1.

The first color number table TBL1 specifies, according to the stack number NS, the color numbers NC of the pattern images 400 projected by the projectors 200 equivalent to the stack number NS.

For example, when the stack number NS is two and the projected images PM of the first projector 200A and the second projector 200B are superimposed each other, the determining section 113 determines the color numbers NC as follows. The determining section 113 determines the color number NC of a color of the pattern image 400 projected by the first projector 200A as "No. 1" and determines the color number NC of a color of the pattern image 400 projected by the second projector 200B as "No. 2".

For example, when the stack number NS is four and the projected images PM of the first projector 200A, the second projector 200B, the third projector 200C, and the fourth projector 200D are superimposed one another, the determining section 113 determines the color numbers NC as follows. The determining section 113 determines the color number NC of a color of the pattern image 400 projected by the first projector 200A as "No. 2" and determines the color number NC of a color of the pattern image 400 projected by the second projector 200B as "No. 3". The determining section 113 determines the color number NC of a color of the pattern image 400 projected by the third projector 200C as "No. 6" and determines the color number NC of a color of the pattern image 400 projected by the fourth projector 200D as "No. 7".

For example, when the stack number NS is six and the projected images PM of the first to sixth projectors 200A to 200F are superimposed one another, the determining section 113 determines the color numbers NC as follows. The determining section 113 determines the color number NC of a color of the pattern image 400 projected by the first projector 200A as "No. 2" and determines the color number NC of a color of the pattern image 400 projected by the second projector 200B as "No. 3". The determining section 113 determines the color number NC of a color of the pattern image 400 projected by the third projector 200C as "No. 12" and determines the color number NC of a color of the pattern image 400 projected by the fourth projector 200D as "No. 13". The determining section 113 determines the color number NC of a color of the pattern image 400 projected by the fifth projector 200E as "No. 8" and determines the color number NC of a color of the pattern image 400 projected by the sixth projector 200F as "No. 4".

2-3. Second Color Number Table

FIG. 7 is a diagram showing an example of the second color number table TBL2. The second color number table TBL2 specifies a relation between the color numbers NC and the R components LR, the G components LG, and the B components LB of the pattern images 400 indicated by the color numbers NC.

In the embodiment of the present disclosure, the R components LR, the G components LG, and the B components LB are specified by 256 gradations. That is, values of the R components LR, the G components LG, and the B components LB are values of 0 to 255.

For example, when the stack number NS is two and the projected images PM of the first projector 200A and the second projector 200B are superimposed each other, the color number NC of a color of the pattern image 400 projected by the first projector 200A is "No. 1", and the color number NC of a color of the pattern image 400 projected by the second projector 200B is "No. 2".

As shown in FIG. 7, the color of the pattern image 400, the color number NC of which is "No. 1", is specified by the following Expression (1) and the color of the pattern image 400, the color number NC of which is "No. 2", is specified by the following Expression (2).

$$(LR, LG, LB) = (0, 255, 255) \quad (1)$$

$$(LR, LG, LB) = (255, 0, 0) \quad (2)$$

For example, when the stack number NS is four and the projected images PM of the first projector 200A, the second projector 200B, the third projector 200C, and the fourth projector 200D are superimposed one another, the color number NC of a color of the pattern image 400 projected by the first projector 200A is "No. 2", the color number NC of a color of the pattern image 400 projected by the second projector 200B is "No. 3", the color number NC of a color of the pattern image 400 projected by the third projector 200C is "No. 6", and the color number NC of a color of the pattern image 400 projected by the fourth projector 200D is "No. 7".

As shown in FIG. 7, the color of the pattern image 400, the color number NC of which is "NO. 2", is specified by the above Expression (2), the color of the pattern image 400, the color number NC of which is "No. 3", is specified by the following Expression (3), the color of the pattern image 400, the color number NC of which is "No. 6", is specified by the following Expression (4), and the color of the pattern image 400, the color number NC of which is "No. 7", is specified by the following Expression (5).

$$(LR, LG, LB) = (0, 255, 0) \quad (3)$$

$$(LR, LG, LB) = (0, 128, 192) \quad (4)$$

$$(LR, LG, LB) = (128, 0, 192) \quad (5)$$

As shown in FIG. 6, when the stack number NS is two to six, the colors of the pattern images 400, the color numbers NC of which are "No. 1" to "No. 13", specify colors of the pattern images 400 projected by the respective projectors 200 equivalent to the stack number NS.

The colors of the pattern images 400, the color numbers NC of which are "No. 1" to "No. 13", are set to be colors different from the specific color. In this embodiment, the "specific color" is white. That is, the colors of the pattern images 400, the color numbers NC of which are "No. 1" to "No. 13", are set to be colors different from white.

In this way, the colors of the pattern images 400 projected by the respective projectors 200 equivalent to the stack number NS are the colors different from white. Therefore, the user can easily visually recognize the positions of the pattern images 400 projected by the respective projectors 200 and the positions of the superimposed pattern images 400 equivalent to the stack number NS.

The colors of the pattern images 400, the color numbers NC of which are "No. 1" to "No. 13", are set such that relative luminous efficiency is equal to or larger than a threshold. The "relative luminous efficiency" indicates strength of brightness of wavelengths of light felt by human eyes.

In this way, the relative luminous efficiency of the colors of the pattern images 400 projected by the respective projectors 200 equivalent to the stack number NS is set to be equal to or larger than the threshold. Therefore, the user can easily visually recognize the positions of the pattern images 400 projected by the respective projectors 200.

2-4. Superimposed State at the Time when the Stack Number is Four

Figure 8:
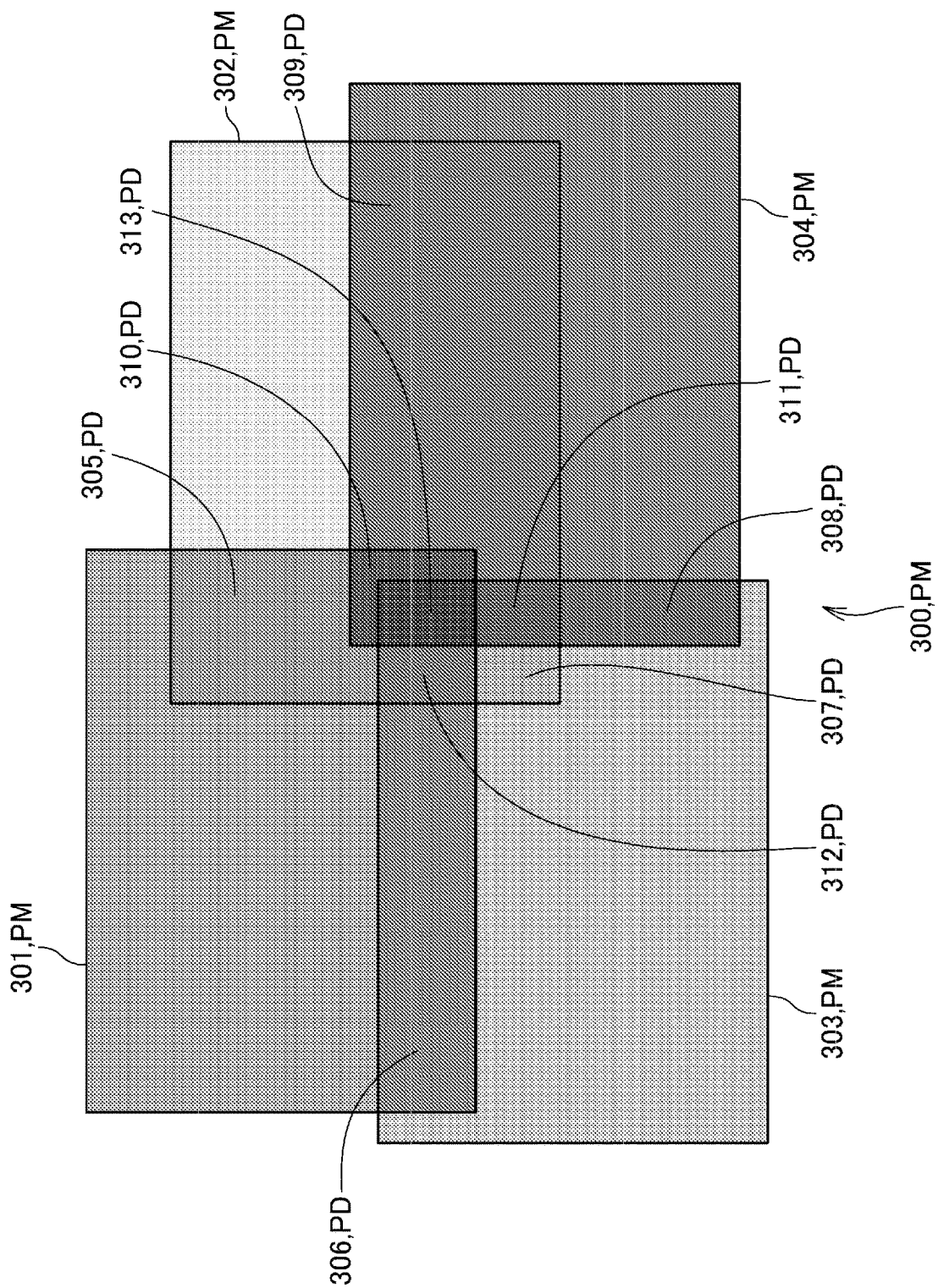
FIG. 8 is a diagram showing an example of a superimposed state of projected images at the time when the stack number is four.

FIG. 8 is a diagram showing an example of a superimposed state of the projected images PM at the time when the stack number NS is four. In FIG. 8, for convenience of explanation, the projected images PM are rectangular solid images. The projected images PM correspond to an example of a "pattern image".

A projected image 300 shown in FIG. 8 indicates an example of the projected image PM projected onto the screen SC by the first to fourth projectors 200A to 200D when the stack number NS is four.

The projected image 300 includes a projected image 301, a projected image 302, a projected image 303, and a projected image 304.

The projected image 301 indicates the projected image PM projected by the first projector 200A. The projected image 302 indicates the projected image PM projected by the second projector 200B. The projected image 303 indicates the projected image PM projected by the third projector 200C. The projected image 304 indicates the projected image PM projected by the fourth projector 200D.

The projected image 300 includes a superimposed image 305, a superimposed image 306, a superimposed image 307, a superimposed image 308, a superimposed image 309, a superimposed image 310, a superimposed image 311, a superimposed image 312, and a superimposed image 313. In the following explanation, the respective superimposed images 305 to 313 are sometimes described as superimposed images PD.

The respective superimposed images 305 to 313 indicate images obtained by superimposing two or more projected images PM among the projected images 301 to 304.

The respective superimposed images 305 to 309 indicate images obtained by superimposing two projected images PM among the projected images 301 to 304.

Specifically, the superimposed image 305 indicates an image obtained by superimposing the projected image 301 and the projected image 302. The superimposed image 306 indicates an image obtained by superimposing the projected image 301 and the projected image 303. The superimposed image 307 indicates an image obtained by superimposing the projected image 302 and the projected image 303. The superimposed image 308 indicates an image obtained by superimposing the projected image 303 and the projected image 304. The superimposed image 309 indicates an image obtained by superimposing the projected image 302 and the projected image 304.

The respective superimposed images 310 to 312 indicate images obtained by superimposing three projected images PM among the projected images 301 to 304.

Specifically, the superimposed image 310 indicates an image obtained by superimposing the projected image 301, the projected image 302, and the projected image 304. The superimposed image 311 indicates an image obtained by superimposing the projected image 302, the projected image 303, and the projected image 304. The superimposed image 312 indicates an image obtained by superimposing the projected image 301, the projected image 302, and the projected image 303.

The superimposed image 313 indicates an image obtained by superimposing all of the projected images 301 to 304.

FIG. 9 is a diagram showing an example of R, G, and B components of the images shown in FIG. 8.

A left end column in the diagram of FIG. 9 indicates reference signs of the projected images 301 to 304 and the superimposed images 305 to 313. A second column from the left side in the diagram of FIG. 9 indicates a superimposed state SS.

For example, "301+302" is described in the column of the superimposed state SS of the superimposed image 305 and indicates that the superimposed image 305 is an image obtained by superimposing the projected image 301 and the projected image 302. For example, "301+302+304" is described in the column of the superimposed state SS of the superimposed image 310 and indicates that the superimposed image 310 is an image obtained by superimposing the projected image 301, the projected image 302, and the projected image 304. For example, "301+302+303+304" is described in the column of the superimposed state SS of the superimposed image 313 and indicates that the superimposed image 313 is an image obtained by superimposing all of the projected images 301 to 304.

As shown in FIG. 9, colors of the respective superimposed images 305 to 309 are specified by the following Expressions (6) to (10).

$$(LR, LG, LB) = (255, 255, 0) \quad (6)$$

$$(LR, LG, LB) = (255, 128, 192) \quad (7)$$

$$(LR, LG, LB) = (0, 383, 192) \quad (8)$$

$$(LR, LG, LB) = (128, 128, 384) \quad (9)$$

$$(LR, LG, LB) = (128, 255, 192) \quad (10)$$

Colors of the superimposed images 310 to 313 are specified by the following Expressions (11) to (14).

$$(LR, LG, LB) = (383, 255, 192) \quad (11)$$

$$(LR, LG, LB) = (128, 383, 384) \quad (12)$$

$$(LR, LG, LB) = (255, 383, 192) \quad (13)$$

$$(LR, LG, LB) = (383, 383, 384) \quad (14)$$

In this way, when the stack number NS is four, the colors of the respective superimposed images 305 to 309 are colors different from white as indicated by Expressions (6) to (10). The colors of the respective superimposed images 310 to 312 are colors different from white as indicated by Expressions (11) to (13). The color of the superimposed image 313 is white.

In other words, colors of the pattern images 400 projected by the respective first to fourth projectors 200A to 200D are determined such that the colors of the respective superimposed images 305 to 312 are colors different from white.

Therefore, the user can easily recognize the position of the superimposed image 313 and the positions of the superimposed images 305 to 312.

The colors of the respective superimposed images 305 to 312 are colors different from one another. In other words, the colors of the pattern images 400 projected by the respective first to fourth projectors 200A to 200D are determined such that the colors of the respective superimposed images 305 to 312 are colors different from one another.

Therefore, the user can easily recognize the positions of the respective superimposed images 305 to 312.

The colors of the respective superimposed images 305 to 312 are colors different from the colors of the respective projected images 301 to 304. In other words, the colors of the pattern images 400 projected by the respective first to fourth projectors 200A to 200D are determined such that the colors of the respective superimposed images 305 to 312 are colors different from the colors of the respective projected images 301 to 304.

Therefore, the user can easily recognize the positions of the respective projected images 301 to 304 and the positions of the superimposed images 305 to 312.

3. Processing by the First Control Section

Figure 10:
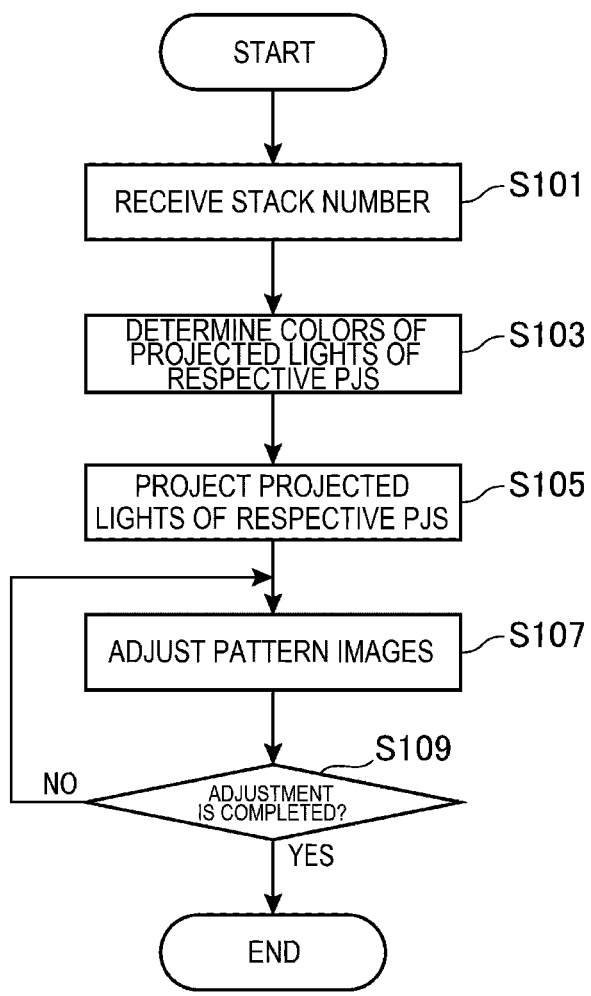
FIG. 10 is a flowchart showing an example of processing by the first control section.

FIG. 10 is a flowchart showing an example of processing by the first control section 110.

As shown in FIG. 10, in step S101, the first control section 110 receives the stack number NS based on operation by the user.

Subsequently, in step S103, the determining section 113 determines colors of the pattern images 400 projected by the respective projectors 200 equivalent to the stack number NS.

Specifically, the determining section 113 determines, based on the stack number NS, referring to the first color number table TBL1, the color numbers NC of the pattern images 400 projected by the respective projectors 200 equivalent to the stack number NS. The determining section 113 determines, referring to the second color number table TBL2, the R components LR, the G components LG, and the B components LB of the pattern images 400 projected by the respective projectors 200 equivalent to the stack number NS.

Subsequently, in step S105, the projection control section 114 causes the respective projectors 200 equivalent to the stack number NS to project the pattern images 400 having the colors determined by the determining section 113.

Subsequently, in step S107, the first control section 110 adjusts, based on operation by the user, the positions and the like of the pattern images 400 of the respective projectors 200 equivalent to the stack number NS.

Subsequently, in step S109, the first control section 110 determines, based on the operation by the user, whether the adjustment of the positions and the like of the pattern images 400 of the projectors 200 equivalent to the stack number NS is completed.

When the first control section 110 determines that the adjustment of the positions and the like of the pattern images 400 of the respective projectors 200 equivalent to the stack number NS is not completed (NO in step S109), the processing returns to step S107. When the first control section 110 determines that the adjustment of the positions and the like of the pattern images 400 of the respective projectors 200 equivalent to the stack number NS is completed (YES in step S109), the processing ends.

Step S103 corresponds to an example of a "determining step". Step S105 corresponds to an example of a "projecting step".

4. Pattern Image

Figure 11:
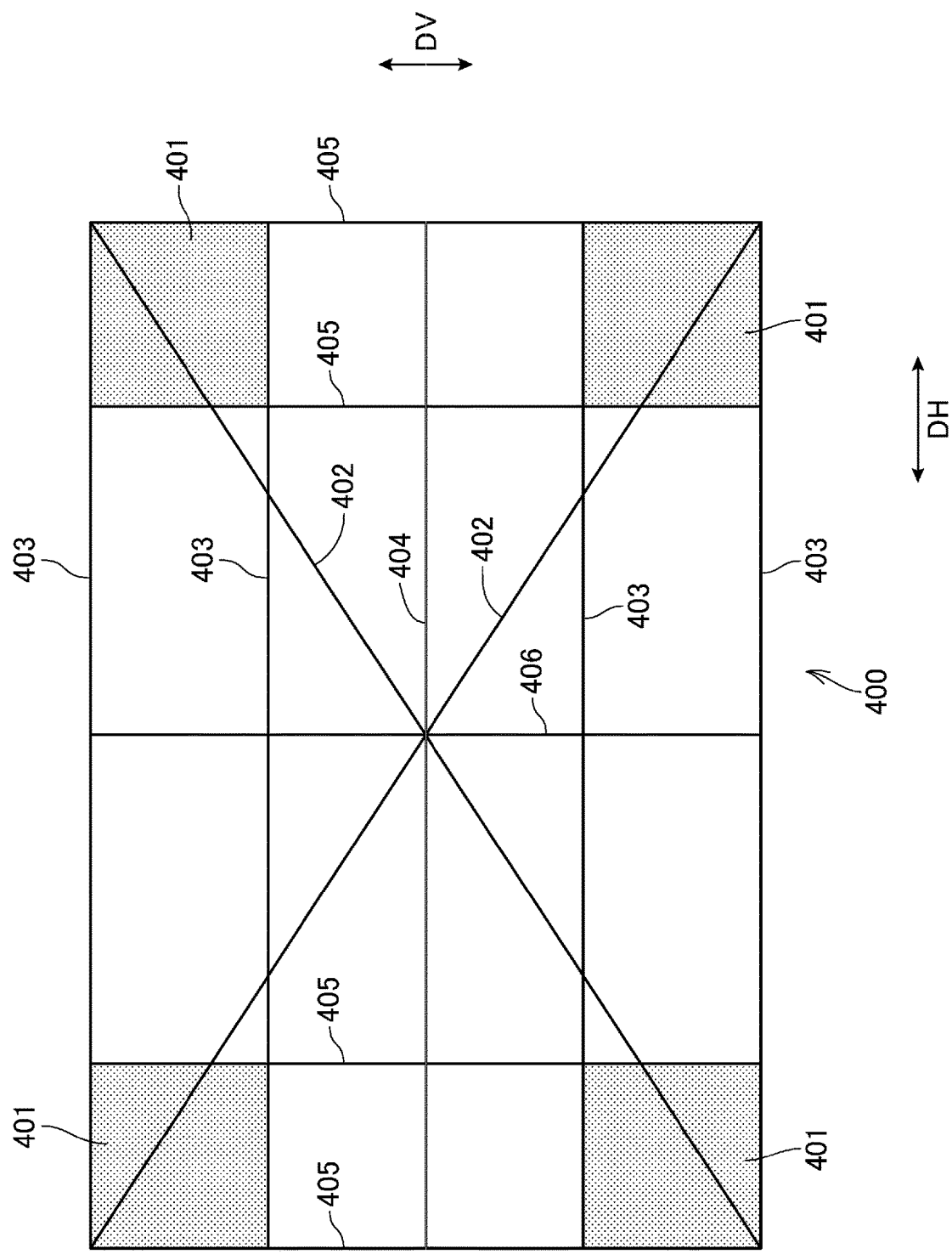
FIG. 11 is an image diagram showing an example of a pattern image.

FIG. 11 is an image diagram showing an example of the pattern image 400.

As shown in FIG. 11, the pattern image 400 includes rectangular images 401, diagonal line images 402, horizontal line images 403, a center line image 404, vertical line images 405, and a center line image 406.

The rectangular images 401 are images formed in a rectangular shape and are disposed at respective four corners of the pattern image 400. A size of the rectangular images 401 is determined according to an ability for correcting a size of a projection region of the projector 200.

The user adjusts the positions and the like of the pattern images 400 of the respective projectors 200 equivalent to the stack number NS such that at least parts of respective four rectangular images 401 forming the pattern images 400 of the respective projectors 200 equivalent to the stack number NS overlap.

Specifically, the user adjusts the positions and the like of the pattern images 400 of the respective projectors 200 equivalent to the stack number NS such that at least parts of the rectangular images 401 arranged at the upper left of the pattern images 400 of the respective projectors 200 equivalent to the stack number NS overlap.

The user adjusts the positions and the like of the pattern images 400 of the respective projectors 200 equivalent to the stack number NS such that at least parts of the rectangular images 401 arranged at the upper right of the pattern images 400 of the respective projectors 200 equivalent to the stack number NS overlap.

The user adjusts the positions and the like of the pattern images 400 of the respective projectors 200 equivalent to the stack number NS such that at least parts of the rectangular images 401 arranged at the lower left of the pattern images 400 of the respective projectors 200 equivalent to the stack number NS overlap.

The user adjusts the positions and the like of the pattern images 400 of the respective projectors 200 equivalent to the stack number NS such that at least parts of the rectangular images 401 arranged at the lower right of the pattern images 400 of the respective projectors 200 equivalent to the stack number NS overlap.

The diagonal line images 402 indicate images corresponding to the diagonal lines of the pattern image 400.

The horizontal line images 403 indicate images of straight lines in a direction parallel to the left-right direction DH. The horizontal line images 403 are arranged in positions corresponding to the upper ends and the lower ends of the rectangular images 401.

The center line image 404 is arranged in the center in the up-down direction DV of the pattern image 400 and indicates an image of a straight line in the direction parallel to the left-right direction DH.

The vertical line images 405 indicate images of straight lines in a direction parallel to the up-down direction DV. The vertical line images 405 are arranged in positions corresponding to the right ends and the left ends of the rectangular images 401.

The center line image 406 is arranged in the center in the left-right direction DH of the pattern image 400 and indicates an image of a straight line in the direction parallel to the up-down direction DV.

5. This Embodiment and Action Effects

As explained above with reference to FIGS. 1 to 11, the control method for the image projection system 1 according to this embodiment is a control method for the image projection system 1 including the plurality of projectors 200, the control method for the image projection system 1 including: a determining step of determining, based on the stack number NS indicating the number of the projectors 200, the projected images PM of which are superimposed one another, colors of the pattern images 400 projected by the respective projectors 200 equivalent to the stack number NS; and a projecting step of causing the respective projectors 200 equivalent to the stack number NS to project the pattern images 400 having the colors determined in the determining step. In the determining step, when the pattern images 400 equivalent to the stack number NS are superimposed, the colors of the pattern images 400 projected by the respective projectors 200 equivalent to the stack number NS are determined such that the superimposed pattern images 400 equivalent to the stack number NS have a specific color.

Accordingly, since the colors of the pattern images 400 projected by the respective projectors 200 equivalent to the stack number NS are determined such that the superimposed pattern images 400 equivalent to the stack number NS have the specific color, the user can easily visually recognize the position of the superimposed image PD obtained by superimposing the pattern images 400 equivalent to the stack number NS. Therefore, the user can easily adjust the positions of the respective pattern images 400 equivalent to the stack number NS such that the pattern images 400 equivalent to the stack number NS are superimposed.

The specific color is white.

Accordingly, the user can easily visually recognize the position of the superimposed image PD obtained by superimposing the pattern images 400 equivalent to the stack number NS.

The colors of the pattern images 400 projected in the determining step by the respective projectors 200 equivalent to the stack number NS are determined to be colors different from the specific color.

Accordingly, since the colors of the pattern images 400 projected by the respective projectors 200 equivalent to the stack number NS are different from the specific color, the user can easily visually recognize a positional relation between the pattern images 400 projected by the respective projectors 200 equivalent to the stack number NS and the superimposed image PD obtained by superimposing the pattern images 400 equivalent to the stack number NS.

When the stack number NS is three or more, in the determining step, the colors of the pattern images 400 projected by the respective projectors 200 equivalent to the stack number NS are determined such that, when the number of the projectors 200 corresponding to the superimposed image PD indicating an image obtained by superimposing the pattern images 400 is smaller than the stack number NS, a color of the superimposed image PD is a color different from the specific color.

Accordingly, when the number of the projectors 200 corresponding to the superimposed image PD indicating the image obtained by superimposing the pattern images 400 is smaller than the stack number NS, the color of the superimposed image PD is different from the specific color. Therefore, the user can easily visually recognize a positional relation between the superimposed image PD obtained by superimposing the pattern images 400 of the projectors 200 smaller in number than the stack number NS and the superimposed image PD obtained by superimposing the pattern images 400 equivalent to the stack number NS.

In the determining step, when at least one of the projectors 200 corresponding to a respective pair of the superimposed images PD is different, the colors of the pattern images 400 projected by the respective projectors 200 equivalent to the stack number NS are determined such that colors of the two superimposed images PD are colors different from each other.

Accordingly, when at least one of the projectors 200 corresponding to the respective two superimposed images PD is different, the colors of the two superimposed images PD are colors different from each other. Therefore, the user can easily visually recognize the positions of a plurality of superimposed images PD.

In the determining step, the colors of the pattern images 400 projected by the respective projectors 200 equivalent to the stack number NS are determined such that the color of the superimposed image PD is a color different from the colors of the pattern images 400 projected by the respective projectors 200 equivalent to the stack number NS.

Accordingly, the color of the superimposed image PD is different from the colors of the pattern images 400 projected by the respective projectors 200 equivalent to the stack number NS. Therefore, the user can easily visually recognize a positional relation between the superimposed image PD and the pattern images 400 projected by the respective projectors 200 equivalent to the stack number NS.

In the determining step, the colors of the pattern images 400 projected by the respective projectors 200 equivalent to the stack number NS are determined such that relative luminous efficiency is equal to or larger than a threshold.

Therefore, the user can easily visually recognize the positions of the pattern images 400 projected by the respective projectors 200.

The pattern images 400 includes the rectangular images 401 at respective four corners, and a size of the rectangular images 401 is determined according to an ability for correcting a size of a projection region of the projector 200.

Therefore, the user can properly adjust the positions and the like of the pattern images 400 of the respective projectors 200 equivalent to the stack number NS.

Specifically, as the ability for correcting a size of a projection region of the projector 200 is higher, the size of the rectangular images 401 is set larger. As the size of the rectangular images 401 is larger, the user can more easily perform work for adjusting the positions of the pattern images 400 of the respective projectors 200 such that at least parts of the rectangular images 401 of the projectors 200 equivalent to the stack number NS are superimposed. In a state in which at least parts of the rectangular images 401 of the respective projectors 200 equivalent to the stack number NS are superimposed, the positions of the pattern images 400 of the respective projectors 200 equivalent to the stack number NS can be corrected by the method described in Patent Literature 1 or the like.

The image projection system 1 according to this embodiment is the image projection system 1 including the plurality of projectors 200, the image projection system 1 including: the determining section 113 configured to determine, based on the stack number NS indicating the number of the projectors 200, the projected images PM of which are superimposed one another, colors of the pattern images 400 projected by the respective projectors 200 equivalent to the stack number NS; and the projection control section 114 configured to cause the respective projectors 200 equivalent to the stack number NS to project the pattern images 400 having the colors determined by the determining section 113. When the pattern images 400 equivalent to the stack number NS are superimposed, the determining section 113 determines the colors of the pattern images 400 projected by the respective projectors 200 equivalent to the stack number NS such that the superimposed pattern images 400 equivalent to the stack number NS have a specific color.

Accordingly, since the colors of the pattern images 400 projected by the respective projectors 200 equivalent to the stack number NS are determined such that the superimposed pattern images 400 equivalent to the stack number NS have the specific color, the user can easily visually recognize a region where the pattern images 400 equivalent to the stack number NS are superimposed. Therefore, the user can easily adjust the positions of the respective pattern images 400 equivalent to the stack number NS such that the pattern images 400 equivalent to the stack number NS are superimposed.

6. Other Embodiments

This embodiment explained above is a preferred embodiment. However, embodiments of the present disclosure are not limited to the embodiment explained above. Various modified implementations are possible without departing from the gist of the present disclosure.

In the detailed explanation in this embodiment with reference to FIGS. 5 to 9, the stack number NS is four. However, the present disclosure is not limited to this. The stack number NS only has to be two or more.

In this embodiment, the first control section 110 of the control device 100 includes the determining section 113 and the projection control section 114. However, the embodiments of the present disclosure are not limited to this. Anyone of the plurality of projectors 200 configuring the image projection system 1 may include the determining section 113 and the projection control section 114. In this case, the image projection system 1 may not include the control device 100.

In this embodiment, the projected images PM are the pattern images 400. However, the embodiments of the present disclosure are not limited to this. The projected images PM only have to be pattern images. For example, the projected images PM may be the solid images as shown in FIG. 8.

In this embodiment, the first control section 110 of the control device 100 includes the color-number storing section 115. However, the embodiments of the present disclosure are not limited to this. The color-number storing section 115 may be disposed in a server device communicably coupled via the network NW. In this case, the first control section 110 only has to acquire necessary information from the color-number storing section 115 of the server device. The color-number storing section 115 may be formed in a storage medium such as a CD or a DVD. In this case, the first control section 110 only has to read out necessary information from the storage medium.

In the above explanation in this embodiment, the control device 100 is configured by the personal computer. However, the embodiments of the present disclosure are not limited to this. The control device 100 may be configured by, for example, a tablet terminal, a smartphone, a PDA (Personal Digital Assistant), or the like.

In the above explanation in this embodiment, the control device 100 is communicably coupled to the projectors 200 by the LAN. However, the embodiments of the present disclosure are not limited to this. The control device 100 may be communicably coupled to the projectors 200 by wireless communication such as Wi-Fi (registered trademark).

The functional sections shown in FIGS. 2, 3, and 4 indicate functional components. Specific implementation forms are not particularly limited. That is, hardware individually corresponding to the functional sections does not always need to be implemented. It is also naturally possible to adopt a configuration in which one processor executes programs to realize functions of a plurality of functional sections. Apart of the functions realized by software in the embodiment may be realized by hardware or a part of the functions realized by hardware in the embodiment may be realized by software. Besides, specific detailed configurations of the other sections of the control device 100 can also be optionally changed without departing from the gist of the present disclosure.

The processing units of the flowchart in FIG. 10 are divided according to the main processing contents in order to facilitate understanding of the processing by the control device 100. The processing units are not limited by a way of division and names of the processing units of the flowchart in FIG. 10 and, according to the processing contents, can be divided into a larger number of processing units or can be divided such that one processing unit includes a larger number of kinds of processing. The processing order of the flowchart is not limited to the illustrated example.

A control method of the control device 100 can be realized by causing the first processor 111 included in the control device 100 to execute the first control program corresponding to the control method of the control device 100. The first control program can also be recorded in a computer-readable recording medium. As the recording medium, a magnetic or optical recording medium or a semiconductor memory device can be used. Specifically, examples of the recording medium include portable or stationary recording media such as a flexible disk, a HDD, a CD-ROM (Compact Disk Read Only Memory), a DVD, a Blu-ray (registered trademark) Disc, a magneto-optical disk, a flash memory, and a card-type recording medium. The recording medium may be a nonvolatile storage device such as a RAM, a ROM, or a HDD, which is an internal storage device included in an image processing device. The control method of the control device 100 can also be realized by storing the first control program corresponding to the control method of the control device 100 in a server device or the like and downloading the first control program from the server device to the control device 100.

What is claimed is:

1. A control method for an image projection system including a plurality of projectors, the control method for an image projection system comprising:
a determining step of determining, based on a superimposition number indicating a number of the projectors, projected images of which are superimposed one another, a set of colors of pattern images projected by the respective projectors, the set of colors including a number of colors that is equivalent to the superimposition number, the superimposition number being two or more, the set of colors being different with different values of the superimposition number; and
a projecting step of causing the respective projectors equivalent to the superimposition number to project the pattern images having the colors determined in the determining step, wherein
in the determining step, when the pattern images equivalent to the superimposition number are superimposed, the colors of the pattern images projected by the respective projectors equivalent to the superimposition number are determined such that the superimposed pattern images equivalent to the superimposition number have a specific color.

2. The control method for an image projection system according to claim 1, wherein the specific color is white.

3. The control method for an image projection system according to claim 1, wherein the colors of the pattern images projected in the determining step by the respective projectors equivalent to the superimposition number are determined to be colors different from the specific color.

4. The control method for an image projection system according to claim 1, wherein, when the superimposition number is three or more, in the determining step, the colors of the pattern images projected by the respective projectors equivalent to the superimposition number are determined such that, when a number of the projectors corresponding to a superimposed image indicating an image obtained by superimposing the pattern images is smaller than the superimposition number, a color of the superimposed image is a color different from the specific color.

5. The control method for an image projection system according to claim 4, wherein, in the determining step, when at least one of the projectors corresponding to a respective pair of the superimposed images is different, the colors of the pattern images projected by the respective projectors equivalent to the superimposition number are determined such that colors of the two superimposed images are colors different from each other.

6. The control method for an image projection system according to claim 4, wherein, in the determining step, the colors of the pattern images projected by the respective projectors equivalent to the superimposition number are determined such that the color of the superimposed image is a color different from the colors of the pattern images projected by the respective projectors equivalent to the superimposition number.

7. The control method for an image projection system according to claim 1, wherein, in the determining step, the colors of the pattern images projected by the respective projectors equivalent to the superimposition number are determined such that relative luminous efficiency is equal to or larger than a threshold.

8. The control method for an image projection system according to claim 1, wherein at least one of the pattern images includes rectangular images at respective four corners, and a size of the rectangular images is determined according to an ability for correcting a size of a projection region of the projector.

9. An image projection system including a plurality of projectors, the image projection system comprising:
a determining section configured to determine, based on a superimposition number indicating a number of the projectors, projected images of which are superimposed one another, a set of colors of pattern images projected by the respective projectors, the set of colors including a number of colors that is equivalent to the superimposition number, the superimposition number being two or more, the set of colors being different with different values of the superimposition number; and a projection control section configured to cause the respective projectors equivalent to the superimposition number to project the pattern images having the colors determined by the determining section, wherein when the pattern images equivalent to the superimposition number are superimposed, the determining section determines the colors of the pattern images projected by the respective projectors equivalent to the superimposition number such that the superimposed pattern images equivalent to the superimposition number have a specific color.

\* \* \* \* \*